United States Patent [19]
Blake

[11] 3,923,076
[45] Dec. 2, 1975

[54] TRANSMISSION CONTROL SYSTEM WITH DUAL PURPOSE MODULATING VALVE

[75] Inventor: William Wayne Blake, Wyoming, Ill.

[73] Assignee: Caterpillar Tractor Co., Peoria, Ill.

[22] Filed: Jan. 8, 1975

[21] Appl. No.: 539,273

Related U.S. Application Data

[62] Division of Ser. No. 355,191, April 27, 1973, Pat. No. 3,882,980.

[52] U.S. Cl. .................................. 137/495; 137/594
[51] Int. Cl.² .................. F16K 31/12; F16K 31/143
[58] Field of Search .......... 137/495, 594; 192/109 F

[56] References Cited
UNITED STATES PATENTS
| | | | |
|---|---|---|---|
| 3,137,311 | 6/1964 | Rohweder et al. | 192/109 F UX |
| 3,468,194 | 9/1969 | Horsch et al. | 192/109 F X |

*Primary Examiner*—Henry T. Klinksiek
*Attorney, Agent, or Firm*—Phillips, Moore, Weissenberger, Lempio & Strabala

[57] ABSTRACT

A hydraulic transmission control circuit having selector valves for communicating fluid at a first pressure to selected speed ratio clutches and for communicating fluid at a second pressure to directional clutches capable of acting as master clutches, a first modulating valve for modulating the first fluid pressure and a differential valve for establishing the second fluid pressure relative to the first fluid pressure, the control circuit also including a manually controlled modulating valve having a modulating spool which is manually operable for selectively modulating the second fluid pressure in two discreet operating modes in order to provide more precise regulation over clutch engagement under different operating conditions, the manually controlled modulating valve also including relief means for selectively reducing the first fluid pressure during regulation of the second fluid pressure by the manually controlled modulating valve.

4 Claims, 8 Drawing Figures

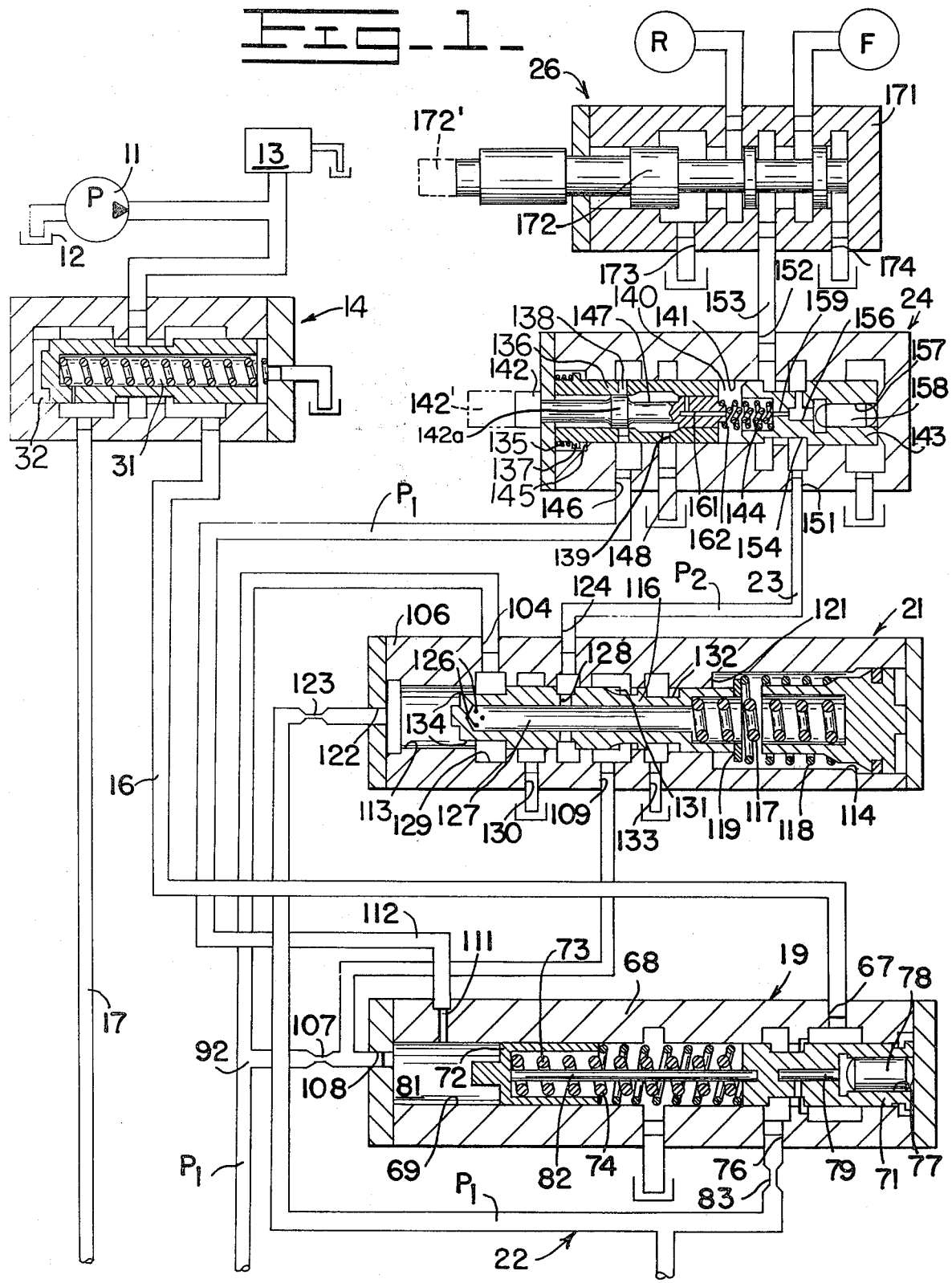

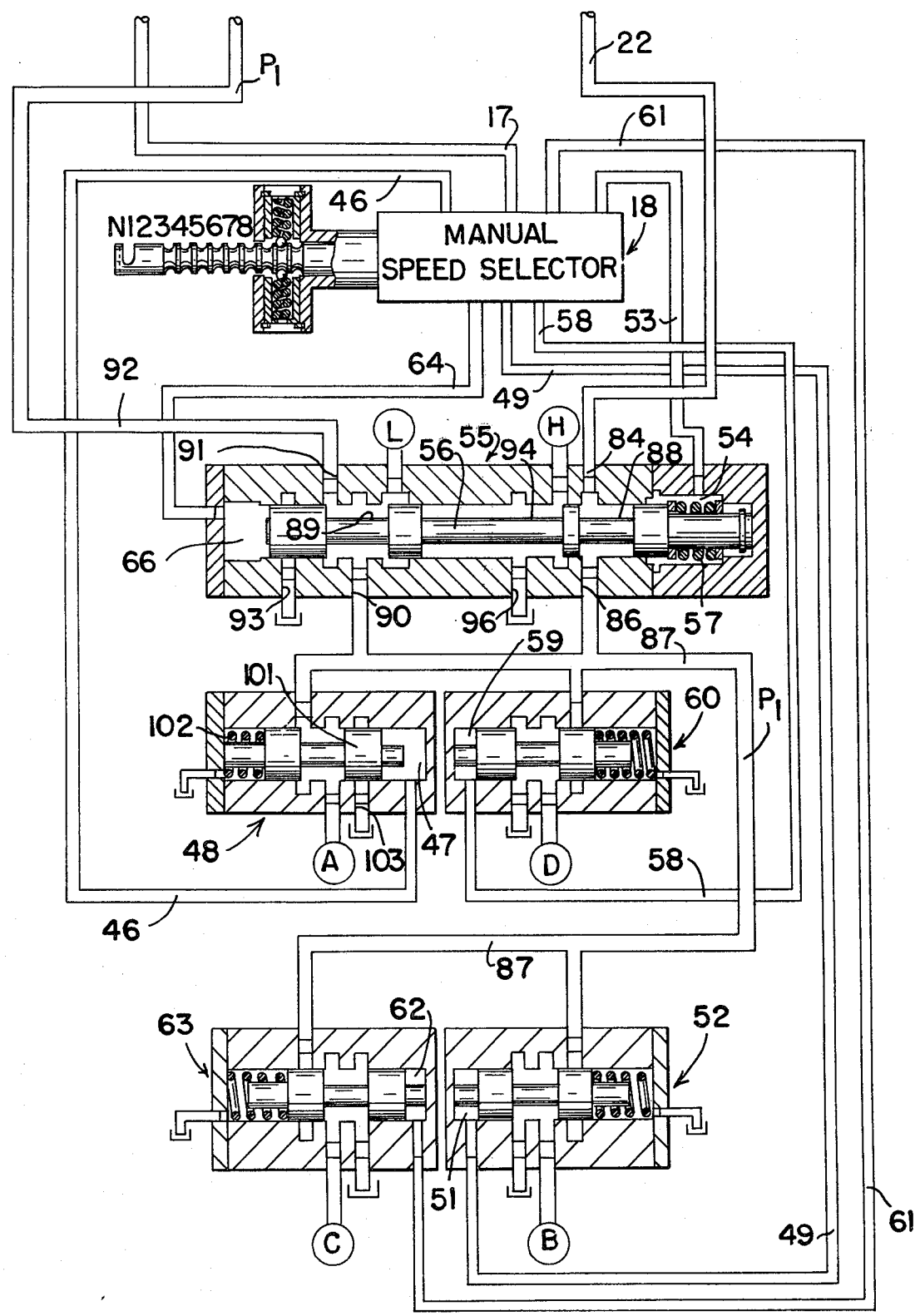

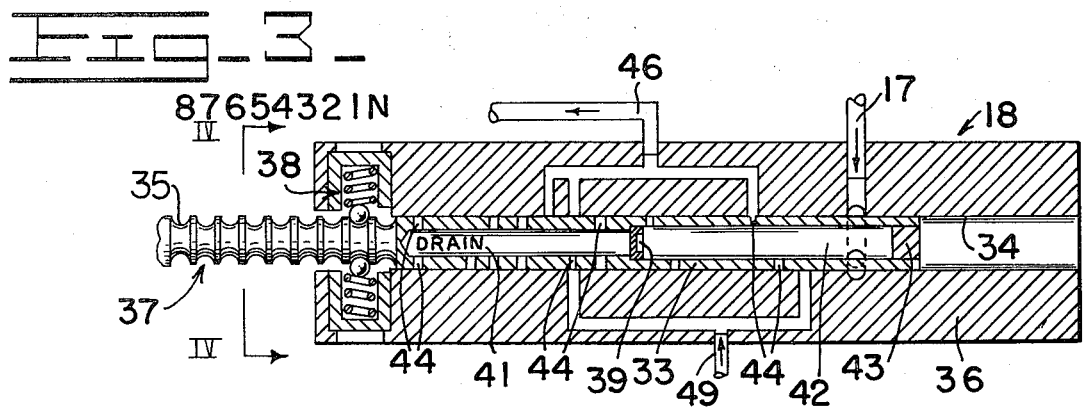
Fig-3-
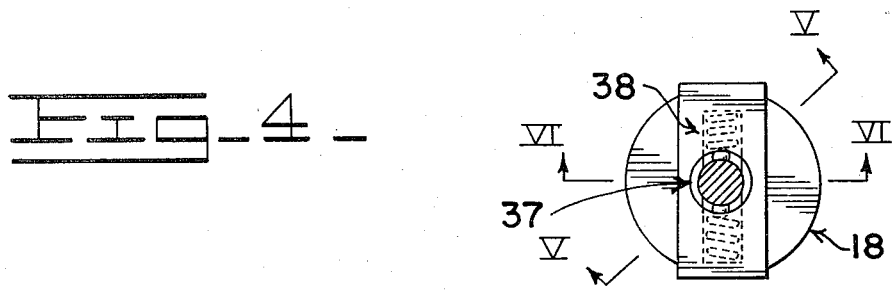
Fig-4-
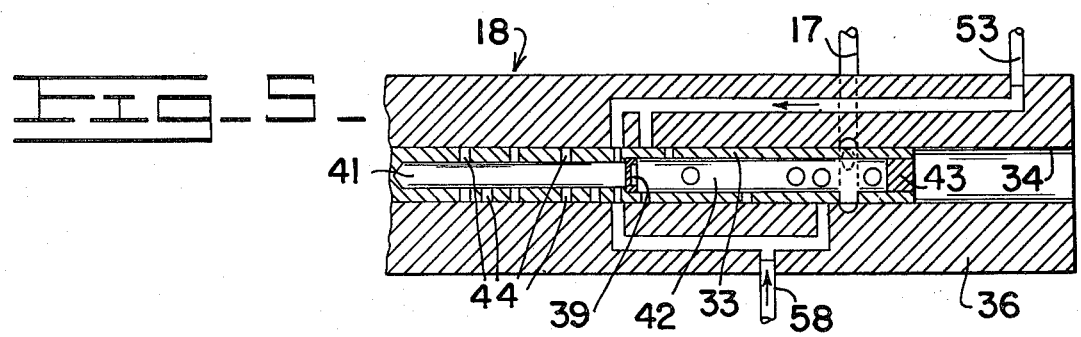
Fig-5-
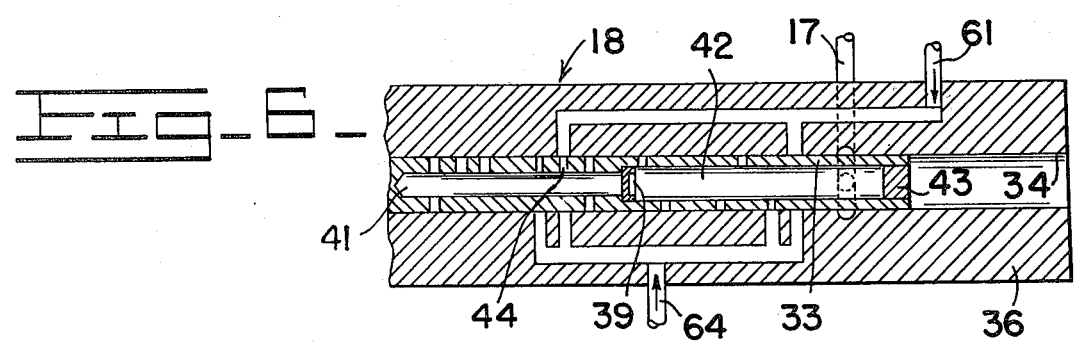
Fig-6-

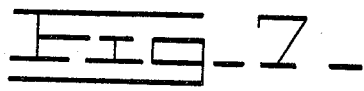
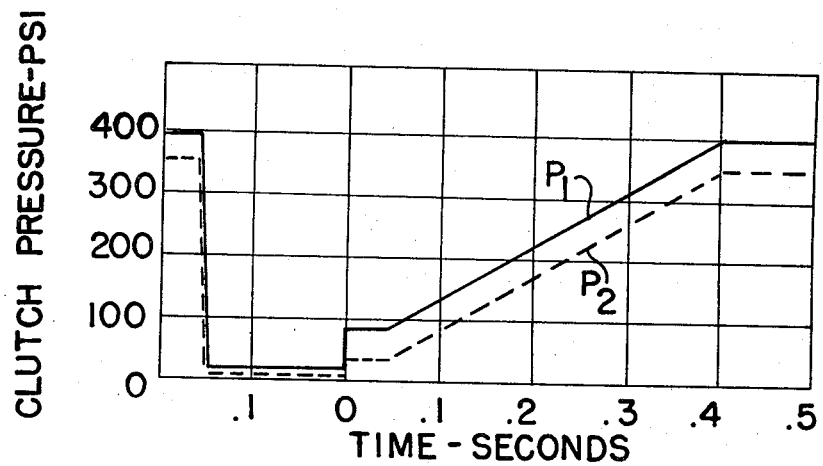
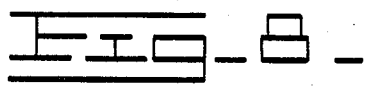
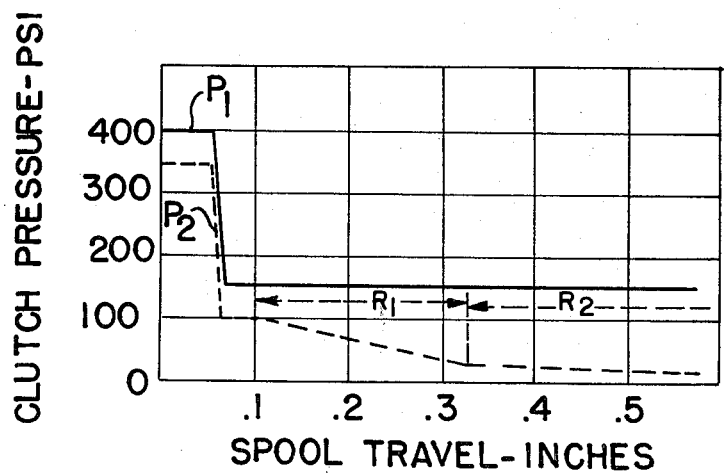

TRANSMISSION CONTROL SYSTEM WITH DUAL PURPOSE MODULATING VALVE

This is a division, of Ser. No. 355,191, filed Apr. 27, 1973, now U.S. Pat. No. 3,882,980.

BACKGROUND OF THE INVENTION

The present invention relates to a hydraulic pressure modulating control circuit and more particularly to such a control circuit for providing a first modulated pressure and a second pressure differentially related to the first pressure for sequentially engaging clutches or brakes within a transmission gear train.

The invention is described herein with particular reference to a transmission of the type having a plurality of gear sets for establishing different speed ratios, the gear sets being separately actuated by individual disc-type friction clutches. The transmission also has forward and reverse input clutches as well as high and low range gear sets actuated by separate clutches. Within such a transmission, one of the range clutches and one of the directional clutches must be engaged together with any one of the speed ratio clutches in order to transmit driving force through the drive train or transmission. It is noted that, although the present description refers to friction clutches for establishing a gear train within the transmission, other transmissions of a type also contemplated by the present invention may include brakes for establishing the selected gear train. For example, in a planetary type transmission wherein a particular speed ratio is established by stopping the rotation of a normally rotating ring gear or carrier of an epicyclic gear train, rotation of the ring gear or carrier is stopped by a disc-type brake. Accordingly, although the following description and claims refer to the use of friction clutches, that term is intended herein to refer to either friction clutches or friction brakes employed to establish a selected gear train within a transmission.

The present invention also particularly contemplates such a transmission wherein one set of clutches for establishing a drive train in the transmission are master clutches which are of heavier and more durable construction than other simultaneously and selectively operable clutches. Accordingly, the master clutches may be engaged sequentially after the other clutches in order to absorb the shock of transmitting power through the drive train of the vehicle. Such an arrangement is well known in the prior art and has been commonly employed for the purpose of avoiding excessive wear. Usually, the speed ratio clutches are initially engaged so that the larger number of clutches of this type may be of smaller and more economical construction. The directional clutches, or possibly the range clutches, may then be employed as master clutches to function in the manner described above. In any event, the friction clutches associated with the speed ratio, range and directional gear trains may be selectively engaged by application of hydraulic pressure within a suitable actuating chamber. In keeping with the above discussion, a speed ratio clutch and a range clutch are engaged at least incrementally prior to engagement of a directional clutch.

The sequential engagement of clutches within the transmission is established through the use of a first fluid pressure and a second fluid pressure differentially related to the first pressure. Accordingly, the present invention contemplates a transmission control circuit of the type employing a differential valve and an associated pressure modulating valve. The particular differential valve and associated pressure modulating valve as described below are similar to those described in U.S. Pat. No. 3,468,194, which issued on Sept. 23, 1969 and was assigned to the assignee of the present invention. However, it is noted that the differential valve and associated pressure modulating valve, as described below, function in a novel manner in association with other valves and hydraulic components within the control circuit of the present invention.

A preferred embodiment of the control circuit of the present invention is particularly adapted for use in an earthmoving vehicle such as a motor grader with a transmission of the type disclosed by Application Ser. No. 284,488 filed Aug. 29, 1972, now abandoned and Application Ser. No. 287,603, filed Sept. 11, 1972, now U.S. Pat. No. 3,815,445 issued June 11, 1974, both assigned to the assignee of the present invention.

SUMMARY OF THE INVENTION

Accordingly, the present invention contemplates a transmission control circuit of the type having a differential valve and an associated pressure modulating valve for supplying fluid at differentially modulated pressures to master clutches within the transmission drive train and other clutches which are to be sequentially engaged prior to the master clutches. In the following description, directional clutches are preferably selected as the master clutches with both speed ratio and range clutches sequentially engaged prior thereto.

Within such a combination, it is an object of the present invention to provide a manual modulating valve for further regulating one of the differential fluid pressures.

It is a more particular object of the invention to modulate the differential pressure supplied to one of the master clutches to provide for manually controlled regulation or modulation of that pressure in two discreet modes in order to more accurately regulate operation of the master clutches and accordingly the transmission.

It is also a more particular object of the present invention to provide a manual modulating valve for further regulating or modulating the differential pressure supplied to the master clutch while also reducing the other pressure supplied to the other clutches. Within the preferred embodiment of the invention as described below, the directional clutches being last engaged, the pressure supplied to the speed ratio and change clutches is reduced while the differential pressure supplied to the directional clutch is modulated or regulated by the manual modulating valve. Reduction of the pressure supplied to the other clutches has been found to permit more precise regulation or modulation by the manual control valve over the fluid pressure supplied to the master clutch while also permitting better recovery response within the transmission control circuit when the transmission control circuit is restored to full pressure operation. It is to be noted that the manual modulating valve of the present invention may be used in substantially the same manner even without the particular differential relation described below and referred to above for the two fluid pressures. For example, it would be possible within the scope of the present invention for the two pressures to be substantially equal.

Additional objects and advantages of the present invention are made apparaent in the following descrip-

BRIEF DESCRIPTION OF THE DRAWINGS

FIG. 1 is a schematic circuit diagram, with parts in section, of a hydraulic transmission control circuit constructed according to the present invention, the circuit of FIG. 1 emphasizing a differential valve and associated pressure modulating valve together with a manually controlled modulating valve which is a particular feature of the present invention.

FIG. 2 is a schematic circuit diagram, with parts in section, of an additional portion of a hydraulic transmission control circuit according to the present invention, FIG. 2 emphasizing a speed ratio selector portion of the circuit for use in combination with the circuit of FIG. 1.

FIG. 3 is a fragmentary sectioned view of a speed selector valve which is illustrated schematically in FIG. 2.

FIG. 4 is a view taken from the left end of the speed selector valve as seen in FIG. 3.

FIGS. 5 and 6 are views taken respectively along section lines V—V and VI—VI of FIG. 4.

FIG. 7 is a graphical representation of multiple pressure traces developed within the control circuit of FIGS. 1 and 2 to emphasize a first pressure and a second differentially related pressure developed primarily by the differential valve of FIG. 1.

FIG. 8 is a graphical representation of the two pressures also illustrated in FIG. 7 while further emphasizing the function of the manually controlled modulating valve of FIG. 1 with respect to the two differential pressures.

DESCRIPTION OF THE PREFERRED EMBODIMENT

The present invention relates to a hydraulic transmission control circuit, of the type preferably embodied as illustrated in FIGS. 1 and 2, for selectively actuating friction clutches to establish a selected drive train through a transmission. Having reference to FIGS. 1 and 2, such a conventional vehicle transmission, which is not otherwise shown, is of a type including a pair of hydraulically actuated directional clutches as indicated at R (reverse) and F (forward). In order to establish a speed ratio within the transmission, additional hydraulically actuated friction clutches as indicated at A, B, C and D function in combination with respective reduction gear sets to establish different speed ratios. Additionally, a pair of range gear clutches, as indicated at L (low range) and H (high range), are also hydraulically actuated so that a selected speed ratio may be established within the transmission by simultaneous actuation of one of the range clutches L and H together with one of the speed ratio clutches A–D. Accordingly, a transmission including such a combination of clutches is operable to provide eight operative speed ratios. These eight speed ratios are graphically illustrated in the following Table I wherein the particular combination of actuated clutches is indicated for each speed ratio as represented by the numerals 1-8 and the letter N for neutral. The same eight speed ratios may be established in either direction of operation by subsequent engagement by one of the directional clutches R and F.

TABLE I

| SPEED (F or R) | REDUCTION GEAR | | | | RANGE | |
|---|---|---|---|---|---|---|
| | A | B | C | D | H | L |
| N | | | | X | X | |
| 1 | X | | | | | X |
| 2 | | X | | | | X |
| 3 | | | X | | | X |
| 4 | | | | X | | X |
| 5 | X | | | | X | |
| 6 | | X | | | X | |
| 7 | | | X | | X | |
| 8 | | | | X | X | |

Referring now to both of FIGS. 1 and 2, the transmission control circuit of the present invention is supplied with hydraulic fluid under pressure by a pump or source 11 drawing fluid from a reservoir 12. A pressure relief valve 13 regulates output pressure from the pump 11 to maintain an initial predetermined pressure of for example 400 psi.

Fluid under pressure from the pump 11 is divided by a priority reducing valve 14 which functions to establish main rail fluid pressure in a conduit 16 while also communicating fluid pressure at a substantially lower pressure to a conduit 17. The lower fluid pressure in conduit 17 is supplied to a speed selector valve 18 (FIG. 2). The speed selector valve 18 is manually operable in a manner described in greater detail below to selectively actuate one of the range clutches L and H and to simultaneously actuate one of the speed ratio clutches A–D.

Main rail fluid in the conduit 16 is supplied to a modulating valve 19 which operates in association with a differential valve 21 to supply first modulated fluid pressure $P_1$ in a branched conduit 22 and a second pressure $P_2$ in a conduit 23, the pressure $P_2$ being differentially related to the pressure $P_1$ as described in greater detail below. The pressure $P_1$ in conduit 22 is supplied to the speed selector section of the control circuit as illustrated in FIG. 2.

The differential pressure $P_2$ is further regulated or modulated by a manual modulating valve 24 and then supplied to a directional selector valve 26 which is also manually operable to select one of the directional clutches R or F. The manual modulating valve 24 is also operable in a manner described in greater detail below to selectively decrease the pressure $P_1$ while it is regulating or further modulating the pressure $P_2$ as supplied to one of the clutches R or F.

The various components of the transmission control circuit of FIGS. 1 and 2 are described in greater detail below with continued reference to those two figures. The priority reducing valve 14 includes a spring-loaded spool 31 with fluid from the pump 11 entering a chamber 32, the spring-loaded spool thus functioning in a pressure-reducing mode to deliver fluid at a reduced pressure of, for example, 85 psi to the conduit 17. The spool 31 simultaneously functions to communicate substantially full pump pressure of, for example, 400 psi to the conduit 16.

Referring now to FIG. 2, the conduit 17 communicates the reduced pressure of 85 psi, which may be considered a pilot pressure, to the speed selector valve 18 which is shown in greater detail in FIGS. 3–6. Having reference also to those figures, the speed selector valve 18 includes a manifold spool 33 slidably arranged within a bore 34 in a valve body 36. The manifold spool 33 is manually adjustable by means not shown while one end 37 of the spool extends from the bore 34 and forms a plurality of detent grooves. A spring-loaded detent assembly 38 functions in combination with the detent grooves 35 to accurately determine and maintain a selected spool position.

Positions for the spool 33 corresponding to the speed ratios illustrated in Table I are indicated by the numerals 1-8 and the letter N.

The interior of the manifold spool 33 is divided by a centrally arranged plug 39 to form a drain cavity 41 and a pressure chamber 42. With the drain cavity 41 and pressure chamber 42 being formed by counterboring within the spool 33, the rightward end of the spool and the pressure chamber 42 are closed by a plug as indicated at 43.

A substantial number of orifices and passages, collectively indicated at 44, are formed in the valve body 36 and the spool 33. The full arrangement of orifices 44 may be seen by combined reference to the various longitudinal planes within the valve as illustrated by FIGS. 3, 5 and 6. The orifices 44 are axially and circumferentially arranged to provide communicating fluid paths in order to selectively pressurize or drain various conduits as described in greater detail below.

As shown in FIGS. 2 and 3, a conduit 46 communicates the speed selector valve 18 with a control chamber 47 in a valve 48 which is operable in a manner described below for actuating clutch A. A second conduit 49 communicates the valve 18 with a controlled chamber 51 in a valve 52 which is operable to actuate clutch B. Referring to FIG. 5, a conduit 53 communicates the valve 18 with another control chamber 54 of a three-position range selector valve 55. Within the valve 55, a spool 56 is biased toward a central position by means of a spring 57. Pressurized fluid entering the control chamber 54 through the conduit 53 tends to force the spool 56 in a leftward direction as viewed in FIG. 2 in order to actuate the high range clutch H. An additional conduit 58 communicates the valve 18 with a control chamber 59 of a valve 60 which is operable to actuate the clutch indicated at D.

Referring now to FIG. 6, another conduit 61 communicates the valve 18 with a control chamber 62 in a valve 63 which is operable to actuate the clutch C. Yet another conduit 64 communicates the valve 18 with a control chamber 66 in the opposite end of the range selector valve 55 from the chamber 54 for actuating the low range clutch L. Additional structural and operating features of the speed selector segment of the control circuit as shown in FIG. 2 are futher described below, along with cooperating elements of the control circuit as illustrated in FIG. 1.

Referring again to FIG. 1, substantially full pressure from the pump 11 is supplied through the conduit 16 to an inlet passage 67 in the modulating valve 19. The modulating valve 19 has a valve body 68 forming a bore 69. A modulating reducing valve spool 71 is arranged within the bore 69 adjacent the inlet passage 67. A load piston 72 is also arranged within the bore 69 with a pair of springs 73 and 74 arranged for interaction between the load piston 72 and reducing spool 71. The springs 73 and 74 tend to urge the load piston 72 and spool 71 into opposite ends of the bore 69. An outlet passage 76 is also formed in communication with the bore 69, the reducing spool 71 being movable in the bore 69 to regulate fluid communication from the inlet passage 67 to the outlet passage 76 and accordingly to the branched conduit 22. As will be discussed in greater detail below, the conduit 22 provides communication both to the differential valve 21 and the speed selector valve 18 as shown in FIG. 2.

The rightward end of the reducing spool 71 as viewed in FIG. 1, forms a chamber 77 containing a reaction slug 78. Fluid from the the inlet passage 67 is communicated into the chamber 77 by a cross-drilled passage 79 formed in the spool 71 so that the spool 71 acts in a generally conventional fashion as a modulating reducing valve.

An end 81 of the bore 69 adjacent the load piston 72 forms a load piston chamber. Fluid pressure developed in the load piston chamber 81 in a manner described in greater detail below, urges the load piston 72 against the springs 73 and 74 while a tube 82 supported by inner spring 73 limits rightward movement of the load piston 72 relative to the spool 71. Accordingly, the modulating spool 71 and load piston 72 interact through the springs 73 and 74 to modulate fluid pressure communicated through the inlet passage 67 to the outlet passage 76 of the pressure modulating valve 19. In the absence of fluid pressure, the load piston 72 is urged to the left end of the bore 69; however, as fluid pressure develops within the load piston chamber 81, the load piston 72 is urged rightwardly into a position such as that illustrated in FIG. 1.

Modulation or the rate of pressure increase for the main rail hydraulic fluid pressure $P_1$ as produced by the pressure modulating valve 19 is graphically represented by the solid line trace in FIG. 7.

A restrictive orifice 83 regulates the flow of fluid from the outlet passage 76 into the branched conduit 22 for communication to the range selector valve 55 of FIG. 2. The range selector valve 55 has an inlet passage 84 in communication with the conduit 22 and an outlet passage 86 in communication with another branched conduit 87. An annular groove 88 in the spool 56 provides constant fluid communication between the inlet passage 84 and the outlet passage 86 regardless of the position of the spool 56 within the range selector valve 55. The valve 55 has an additional inlet passage 90 in communication with the branched conduit 87 while another annular groove 89 provides selective communication between the inlet passage 90 and an outlet passage 91. The outlet passage 91 is in communication with still another branched conduit 92 which communicates fluid to both the load piston chamber 81 of the pressure modulating valve 19 and the differential valve 21. The annular groove 89 also provides selective communication from the inlet passage 90 to the low range clutch L and also from the outlet passage 91 to drain passage 93.

When the spool 56 is centrally positioned within the range selector valve 55 by the spring 57, another annular groove 94 communicates the low range clutch L with a drain passage 96. The spool 56 remains in its springcentered position when the speed selector spool 33 (See FIG. 3) is manually set in any of the high speed ranges 5–8 since neither of the actuating chambers 54 or 66 in the range selector valve 55 is then pressurized. When the speed selector spool 33 is moved to the neutral position indicated at N, fluid from the conduit 17 is communicated to the actuating chamber 54 and the spool 56 is shifted leftwardly so that the outlet passage 91 is communicated with the drain passage 93. When the speed selector spool 33 is shifted to any of its low speed ranges 1–4, actuating fluid from the conduit 17 is communicated to the chamber 66 so that the spool 56 is then shifted rightwardly. This position of the spool 56 is illustrated in FIG. 2 with the high range clutch H being in communication with the drain passage 96 and the inlet passage 90 being in communication with both the low range clutch L and the outlet passage 91.

The branched conduit 87, containing modulated main rail fluid pressure $P_1$ is also in communication with an inlet port in each of the actuating valves 48, 52, 60 and 63. The four actuating valves are of silimar construction and the following description for the actuating valve 48 is also applicable to the other valves 52, 60 and 63.

The valve 48 has a spool 101 which tends to be urged rightwardly within the valve 48 as viewed in FIG. 2 by a spring 102. However, the spool 101 is illustrated in a leftwardly shifted position in response to fluid pressure communicated from a speed selector vlave 18 by the conduit 46. This condition, of course, corresponds with the position of the speed selector valve spool in its first speed ratio position as is also illustrated in FIG. 2. With the spool 101 being shifted leftwardly as illustrated, fluid pressure $P_1$ from the conduit 87 is communicated to the speed ratio clutch A. Accordingly, with the speed selector valve in the position shown by FIG. 2, both the speed ratio clutch A and the low range clutch L are actuated by pressure $P_1$ from the branched conduit 87. When the spool 101 is shifted rightwardly by its spring 102, the clutch A is in communication with the drain passage 103.

It is accordingly believed apparent that the range clutches L and H, as well as the speed ratio clutches A-D, may be respectively actuated by the range selector valve 55 and the various actuating valves 48, 52, 60 and 63 in accordance with the prior description and Table I.

The conduit 92 communicates the outlet port 91 of the range selector valve 55 with an inlet passage 104 formed by the housing 106 of the differential valve 21. As noted above, the conduit 92 is effective to communicate fluid pressure $P_1$ to the inlet passage 104 except when the speed selector valve 18 is in its neutral position N. With the speed selector valve in its neutral position, the conduit 92 provides a fluid drain for the inlet passage 104 which is important to operation of the differential valve 21 as described in greater detail below.

The conduit 92 also has a restrictive orifice 107 for communicating fluid pressure $P_1$ through an inlet passage 108 to the load piston chamber 81 in the modulating valve 19 and to a second inlet passage 109 in the differential valve 21. The restrictive orifice 107 reduces the rate of fluid flow into the inlet passages 108 and 109 to assist in establishing desired timing for operation of the modulating valve 19 and differential valve 21 in accordance with an operating description as set forth below.

The housing 68 for the pressure modulating valve 19 also forms a restricted outlet passage 111 which communicates the load piston chamber 81 with a conduit 112 after the load piston 72 is initially shifted toward the right by fluid pressure from the inlet passage 108. The conduit 112 is in communication with the manual modulating valve 24 as is also discussed in greater detail below.

The pressure differential valve 21 provides a regulated flow of hydraulic fluid at the pressure $P_2$, having a differentially constant value compared with the main rail pressure $P_1$, to the directional clutches R and F across the manual modulating valve 24. The differential valve has a bore 113 with a plurality of annular recesses and an enlarged portion 114 at one end thereof. A tubular differential valve spool 116, being closed at one end and having annular grooves along its length, is disposed for longitudinal motion within the bore 113. Two springs 117 and 118 are arranged to exert a differential force upon the valve spool 116. The spring 117 acts directly upon the differential valve spool 116 while the outer spring 118 acts against a washer 119. Leftward motion of the washer 119 is resisted by a shoulder 121 so that the outer spring 118 acts upon the differential valve spool 116 only after it moves rightwardly of the shoulder 121.

The differential valve 21 has an inlet port 122 for receiving fluid at pressure $P_1$ from the branched conduit 22 across a restrictive orifice 123 which has a safety reset delay function. The other inlet port 109 is also in communication with the bore 113 and the branched conduit 92 as described above so that fluid at pressure $P_1$ is communicated into the bore 113, at a restricted rate determined by the size of the orifice 107. The inlet passage 122 provides a first source of hydraulic fluid to act against the differential valve spool 116. As noted above, the inlet passage 104 also communicates fluid at pressure $P_1$ to the bore 113 except when the speed selector valve of FIG. 2 is in its neutral position. The differential valve has an outlet passage 124 for communicating the valve bore 113 with the conduit 23. The differential valve operates to establish the pressure $P_2$ within the conduit 23 as indicated by the broken line trace represented in FIG. 7, the pressure $P_2$ being communicated to the manual modulating valve 24 through the conduit 23.

Multiple ports 126, functioning as a differential fluid pressure regulator, are defined in the differential valve spool 116 to regulate the flow of hydraulic fluid from the inlet passages 122 and 104 to the outlet passage 124 by means of an internal chamber 127 within the differential valve spool and outlet passages 128 formed in the spool 116. The ports 126 permit such flow only when they are in register with an annular recess 129 which communicates the inlet passage 104 with the bore 113.

As is described in greater detail in U.S. Pat. No. 3,468,194, noted above, the differential valve spool is urged rightwardly if the pressure differential between the bore 113 and the internal chamber 127 exceeds a set pressure of, for example, 50 psi. Fluid communication is thereby established from the inlet passages 104 and 122 to a drain passage 130 in order to restore the predetermined pressure differential of 50 psi. The differential valve spool has a plurality of axially formed throttling slots, two of which are indicated at 131. The throttling slots 131 serve to communicate the conduit 23 to the drain passage 130 at a controlled rate when the spool is in its normal neutral position at the left end of the bore 113. The throttling slots control the rate of fluid flow from the directional clutches during speed shifts to reduce the subsequent fill time when the same directional clutch is again engaged. This function is also discussed in greater detail in the above-noted patent. The spool 116 also has an annular groove 132 for communicating the inlet passage 109 with a drain passage 133 when the spool is intermediately positioned to the left of the position illustrated in FIG. 1. This arrangement enables the differential valve to serve as a check valve and insure pressure modulation by the modulating valve 19, until the sequence clutch fill is completed.

Relief flats 134 are formed as flattened surface portions at the end of the differential valve spool 116. The flats 134 eliminate pressure peaks at the end of the fill period for the speed ratio clutches and contribute to a safety function which is briefly described further below.

The manual modulating valve 24 has a bore 141 with a manually operated metering spool 142 and a reducing spool 143 positioned in opposite ends thereof. A spring 144 is arranged for interaction between the manually operated metering spool 142 and the reducing spool 143 and has a tendency to urge them toward their respective ends of the bore 141. The manual modulating valve 24 also has an inlet passage 146 for receiving the restricted flow of main rail hydraulic fluid pressure $P_1$ from the load piston chamber 81 of the modulating valve 19 through the conduit 112. The spool 142 is slidably arranged within a sleeve 136 forming ports 138 and 139 which permit communication between the inlet passage 146 and the drain passage 148 depending upon the positions of both the spool 142 and sleeve 136. Operation of this portion of the valve 24 is described in greater detail below. However, when the spool 142 is in the position illustrated in FIG. 1, a full diameter portion or land 142a blocks the inlet passage 146 and communicating port 138. An annular groove 147 defined in the spool 142 provides fluid communication between the inlet passage 146 and a drain passage 148 when the spool 142 is shifted leftwardly, for example, to the position indicated in broken lines at 142'.

With the spool 142 positioned rightwardly as illustrated in FIG. 1, the inlet passage 146 is blocked and the manual modulating valve 24 has substantially no effect upon the control circuit. As the spool 142 is manually shifted leftwardly towards its position indicated at 142', the passage 146 is progressively opened for communication with the drain passage 148. Metered flow of main rail hydraulic fluid from the load piston chamber 81 of the modulating reducing valve 19 permits the load piston 72 to shift leftwardly within the bore 69. This results in modulated reduction of the main rail hydraulic fluid pressure $P_1$, for example, from the full pressure of 400 psi to 150 psi, as is graphically represented by the solid line trace in FIG. 8.

The manual modulating valve 24 has an inlet passage 151 for communicating the fluid at pressure $P_2$ from the conduit 23 into the bore 141 adjacent the reducing spool 143. An outlet passage 152 communicates the bore 141 with a conduit 153 which delivers fluid pressure to the directional clutches R and F depending upon the operating position of the directional selector valve 26. An annular groove 154 formed by the spool 143 provides regulated communication of hydraulic fluid pressure $P_2$ between the inlet passage 151 and the outlet passage 152 without restriction when the spool 143 is positioned to the right as illustrated in FIG. 1. An internal passage 156 communicates the annular groove 154 with a chamber 157 formed by the spool 143 to receive a reaction slug 158. A small restricted passage 159 communicates the chamber 157 with the bore 141 to the left of the modulating spool. An internal, cross-drilled passage 161 formed in the metering spool 142 thus serves to communicate the passage 159 and chamber 157 with the drain passage 148 when the metering spool is shifted to the left.

As the spool 142 is moved progressively to the left, the reducing spool 143 also tends to be shifted leftwardly by fluid pressure $P_2$ acting against the reaction slug 158. Accordingly, the inlet passage 151 is progressively restricted from communication with the outlet passage 152 in order to control or regulate the flow of hydraulic fluid at differential pressure $P_2$ to the directional selector valve 26.

The manual modulating valve 24 also includes a slideable sleeve 136 arranged within the bore 141 and surrounding the spool 142. The sleeve 136 acts as a hydraulic overcenter device to improve response of the modulating valve 19.

The sleeve 136 is normally shifted completely to the left against a spring 135 by fluid pressure in a chamber 140 formed between the metering spool 142 and reducing spool 143. When the spool 142 is shifted leftwardly from its solid line position in FIG. 1, the chamber 140 is placed in communication with the drain 148 by the passage 161. As fluid is thus vented from the chamber 140, the sleeve 136 is shifted rightwardly by its spring 135 until a flange 137 contacts a shoulder 145. Ports 138 in the sleeve 136 are then aligned with the inlet passage 146 to permit rapid venting of fluid pressure from the piston chamber 81 in the modulating valve 19.

As the spool 142 is again shifted rightwardly, the passage 161 is blocked and the chamber 140 is again pressurized, causing the sleeve 136 to again shift leftwardly to the position shown in FIG. 1. The inlet passage 146 is thus closed more rapidly to commence increased pressurization of the piston chamber 81 in the valve 19.

The directional control valve 26 includes a simple valve body 171 and a movable spool 172. With the spool 172 positioned to the right as illustrated in FIG. 1, the conduit 153 is placed in communication with the forward directional clutch F. With the spool 172 shifted to the left into a position illustrated in broken lines at 172', the conduit 153 is placed in communication with the reverse directional clutch R. When the conduit 153 is in communication with the clutch F, the other directional clutch R is in communication with a fluid drain 173. When the spool 172 is shifted to communicate the conduit 153 with the reverse directional clutch R, the forward directional clutch F is then in communication with another fluid drain 174.

A particularly important function of the present invention lies in a dual modulating rate provided by the manual modulating valve 24. This dual rate is accomplished by the spring 144 and a second spring 162. The second spring 162 is also arranged for interaction between the modulating spool 143 and the metering spool 142. However, the outer spring 162 is sized to reach full extension after initial limited movement of the metering spool 142 to the left. For example, the dual modulating rate established by the two springs 144 and 162 is illustrated by the broken line trace of FIG. 8. Referring also to FIG. 8, it may be seen that approximately 0.1 inch of travel for the metering spool 142 is required to open the drain passage 161.

The pressure $P_2$ is further reduced at a selected rate determined by action of both of the springs 144 and 162 until the metering spool is shifted approximately 0.33 inches to the left. At that point, the outer spring 162 is fully extended so that only the inner spring 144 is interacting between the metering spool 142 and the modulating spool 143. Accordingly, as the metering spool 142 is shifted further to the left from that point, the pressure $P_2$ is modulated at a substantially reduced rate determined only by the spring 144 as illustrated in FIG. 8. These two discrete modes of operation are indicated by the operating ranges identified at $R_1$ and $R_2$ in FIG. 8.

The dual modulation rate described above is particularly suited to provide for accurate control over movement of a vehicle in different operating conditions, for example, in a first condition with the vehicle loaded and in a second position with the vehicle unloaded. Referring again to FIG. 8, it may be seen that for initial travel at a relatively rapid rate from 0.1 to 0.33 inches of the spool 142, pressure $P_2$ is modulated from approximately 100 psi to 25 psi, as suitable for gradually moving or "inching" a loaded vehicle. Further movement of the spool 142 to the left results in modulation at the reduced rate as discussed above, for example, from 25 psi to 3 psi, as is particularly suitable to gradually move or "inch" an unloaded vehicle. Thus, if the vehicle is required to work in close quarters, accurate control over vehicle motion is available for both loaded and unloaded operating conditions.

An additional advantage is accomplished through the design of the manual modulating valve before. For example, in a conventional valve employed for modulation in such applications, the pressure $P_2$ would be relieved to a drain passage. However, within the present invention, the modulating valve spool 143 acts in a reducing mode and permits only a very minor portion of fluid flow from the conduit 23 to be diverted to drain through the very small passage 159 (and the passage 148).

To further clarify and illustrate operation of the present control system, the following operational description is divided into the following three separate operating modes:
1. Starting the vehicle engine with the transmission control inadvertently positioned in gear.
2. Reconditioning the control circuit for a shift from neutral into first gear forward, for example.
3. Adjusting the manually operable modulation valve to regulate the actuating pressure $P_2$ supplied to the directional valves.

STARTING THE VEHICLE ENGINE CONTROL WITH THE TRANSMISSION CONTROL INADVERTENTLY POSITIONED IN GEAR

For this operating mode, assume that the speed selector valve 18 is positioned for first gear operation as shown in FIG. 2. The speed clutch A and the range clutch L are both engaged since actuating fluid is communicated to the control chambers 47 and 66 in the actuating valve 48 and the range selector valve 55 respectively. However, the design of the differential valve 21 in combination with the range selector valve presents actuating of either of the directional gears R and F, which in the present design are intended to act as master clutches as noted above. When the range selector valve 55 is in the first gear position as illustrated in FIG. 2, pressure $P_1$ is in communication with the conduit 92 and accordingly with the inlet passage 104 of the differential valve. Because of the safety reset delay orifice 123, fluid pressure $P_1$ enters the differential valve through the inlet passage 104 before substantial pressure is developed at the left end of the bore 113 from fluid entering into the inlet passage 122. Fluid from the inlet passage 104 is communicated to the differential spool chamber 127 through the passages 128. Pressure thus developed within the chamber 127 cooperates with the springs 117 and 118 to maintain the differential valve spool 116 in a leftward position so that it is not influenced by pressure subsequently entering into the inlet passage 122.

When the range selector valve 55 is subsequently shifted to neutral, it is to be noted that the conduit 92 is placed in communication with the drain passage 93. Accordingly, the inlet passage 104 in the differential valve acts as a drain so that rightward movement of the differential valve spool 116 is resisted only by the springs 117 and 118. Under these conditions, fluid pressure entering the inlet passage 122 shifts the differential valve spool rightwardly only enough so that fluid from the inlet passage 122 crosses the relief flats 134 and is communicated to drain through the passage 104 and the conduit 92. With the speed selector valve 18 thus placed in its neutral position, the differential valve 21 is properly conditioned to commence its function of establishing a differential pressure in conduit 23 when the speed selector valve 18 is again shifted, for example, to the first speed setting with the directional selector valve 26 continuing to be set for actuation of the forward clutch F.

RECONDITIONING THE CONTROL CIRCUIT FOR A SHIFT FROM NEUTRAL INTO FIRST GEAR FORWARD

The first gear forward operating mode is illustrated for the various components of the circuit in FIGS. 1 and 2. As the speed selector valve is adjusted to its first gear setting, fluid from the conduit 17 enters the actuating chamber 47 of the valve 48 and the chamber 66 of the range selector valve 55. Accordingly, the speed ratio clutch A and the range clutch L are actuated by pressure $P_1$. As shown in FIG. 7, the hydraulic pressure $P_1$ drops almost to zero for approximately 0.15 seconds as the speed and range clutch are filling and then increases to a slightly higher pressure for approximately 0.05 seconds as one of the directional clutches is filled.

With the range selector valve spool 56 shifted rightwardly, fluid pressure $P_1$ is again communicated through conduit 92 into the differential valve through inlet passage 104. Accordingly, fluid from the inlet passage 122 can no longer escape through the passage 104 and the differential valve spool 116 is shifted rightwardly to the position shown in FIG. 1 so that fluid from both the inlet passages 122 and 104 enters the internal chamber 127 of the differential valve spool through the ports 126. The differential pressure $P_2$ established within the internal chamber 127 is then communicated to the conduit 23 through the passages 128. The fluid pressure $P_2$ is communicated across the manual modulating valve 24 and through the directional selector valve 26 to the forward clutch F.

ADJUSTING THE MANUALLY OPERABLE MODULATION VALVE TO REGULATE THE ACTUATING PRESSURE $P_2$ SUPPLIED TO THE DIRECTIONAL VALVES

With the clutches thus engaged, an operator of a vehicle (not shown) may then condition the pressure $P_2$ in a dual mode of modulation as described above through manual control of the modulating valve 24.

During manual modulation of the pressure $P_2$ by the spool 143, pressure $P_1$ entering the manual control valve 24 through the inlet passage 146 is communicated to the drain 148 so that the modulated pressure $P_1$ as established by the modulating valve 19 is reduced in the manner described above and shown in FIG. 8.

Thus, the present invention particularly provides for dual rate modulation of a differential pressure $P_2$ to one of the directional master clutches, for example, that indicated at F, to provide accurate control over a vehicle under different operating conditions as was also described above.

Accordingly, it is believed that the above description sets forth a novel, modulating control circuit, particularly in the combination of the manual modulating valve 24 together with the speed control circuit and other components such as the differential valve 21 and associated modulating valve 19.

It may be noted that numerous modifications and variations are possible within the scope of the present invention as defined by the following claims. A particular example of a contemplated variation within the control circuit as illustrated in FIGS. 1 and 2 relates to the number of speed ratio clutches. For example, the present control circuit could also be used in combination with a transmission having, for example, three forward gear ratios employing only clutches A–C. For such an application, it would only be necessary to slightly modify the manual speed selector valve 18 to provide for a neutral operating condition and speeds 1–6. Other possible variations and modifications are also believed to be apparent within the scope of the invention as defined by the following claims.

I claim:

1. A manual modulating valve for a hydraulic control circuit of the type having a first conduit with first modulating means for establishing the first fluid pressure within the first conduit, a second fluid conduit and differential means for establishing a second fluid pressure within the second conduit differentially related to the first fluid pressure, the manual modulating valve comprising, a valve body defining a bore, an inlet passage communicating the second conduit with the bore and an outlet passage also in communication with the bore, a modulating spool movably arranged within the bore to regulate fluid communication between the inlet and outlet passages of the valve body, and a manually adjustable metering spool movably arranged within the bore for interaction with the modulating spool through resilient means, the valve body forming an additional inlet passage for communicating the first conduit with the bore adjacent the manually adjustable metering spool, the manually adjustable metering spool being movable for causing the modulating spool to regulate fluid communication between the inlet and outlet passages, the manually adjustable metering spool simultaneously communicating the additional inlet to a fluid drain in order to selectively reduce the first fluid pressure within the first conduit during operation of the modulating spool.

2. The manual modulating valve of claim 1 wherein the modulating spool forms a chamber in communication with the inlet, fluid pressure within the chamber causing the spool to act as a modulating reducing valve, the manual modulating valve further comprising means for selectively communicating the chamber formed by the modulating spool with a fluid drain in response to movement of the manually adjustable metering spool.

3. The manual modulating valve of claim 2 further comprising a second resilient means arranged for interaction between the manually adjustable metering spool and the modulating spool.

4. The manual modulating valve of claim 1 further comprising a second resilient means arranged for interaction between the manually adjustable metering spool and the modulating spool. The second resilient means interacting between the manually adjustable metering spool and the modulating spool only during initial movement of the manually adjustable metering spool.

* * * * *